United States Patent
Foulger et al.

(10) Patent No.: US 6,569,937 B2
(45) Date of Patent: *May 27, 2003

(54) CROSSLINKED CONDUCTING POLYMER COMPOSITE MATERIALS AND METHOD OF MAKING SAME

(75) Inventors: Stephen H. Foulger, Lexington, SC (US); Jeffrey M. Quinn, Columbia, SC (US); Thierry T. Trial, Columbia, SC (US)

(73) Assignee: Pirelli Cables and Systems, LLC, Lexington, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/908,926

(22) Filed: Jul. 19, 2001

(65) Prior Publication Data

US 2002/0004556 A1 Jan. 10, 2002

Related U.S. Application Data

(63) Continuation of application No. 09/178,140, filed on Oct. 23, 1998, now Pat. No. 6,284,832.
(51) Int. Cl.[7] .................................................. C08K 3/04
(52) U.S. Cl. ........................ 524/496; 524/495; 524/500; 524/524; 252/500; 252/510; 252/511; 252/502
(58) Field of Search .............................. 524/496, 495, 524/500, 524; 252/500, 502, 510, 511

(56) References Cited

U.S. PATENT DOCUMENTS

| | | | | |
|---|---|---|---|---|
| 4,929,388 A | * | 5/1990 | Wessling | 252/500 |
| 5,844,037 A | * | 12/1998 | Lundgard et al. | 524/496 |
| 6,197,219 B1 | * | 3/2001 | Foulger | 252/500 |
| 6,284,832 B1 | * | 9/2001 | Foulger et al. | 524/496 |
| 6,331,585 B1 | | 12/2001 | Thielen et al. | 524/401 |
| 6,331,586 B1 | * | 12/2001 | Thielen et al. | 524/401 |

* cited by examiner

Primary Examiner—Edward J. Cain
Assistant Examiner—Katarzyna W. Lee
(74) Attorney, Agent, or Firm—Norris, McLaughlin & Marcus

(57) ABSTRACT

A conducting polymer composite that is crosslinked comprising a semicrystalline polymer minor phase with conducting filler material dispersed therein in an amount sufficient to generate a continuous conductive network in the minor phase, and which is mixed with major phase polymers, the materials being selected such that the minor phase and major phases will not engage in electrostatic interactions that promote miscibility. The minor phase being dispersed in the major phase in an amount sufficient to generate a continuous conductive network in the composite material. The composite material is crosslinked by physical or chemical means. The crosslinked conducting polymer composite having a reduced amount of conducting filler while supporting a continuous conductive network in the crosslinked polymer composite.

37 Claims, No Drawings

CROSSLINKED CONDUCTING POLYMER COMPOSITE MATERIALS AND METHOD OF MAKING SAME

CROSS-REFERENCE TO RELATED APPLICATIONS

This is a continuation application of Ser. No. 09/178,140 filed Oct. 23, 1998 now U.S. Pat. No. 6,284,832.

FIELD OF INVENTION

The present invention relates to conducting polymer composite materials that are crosslinked and the method of making such composite materials. Specifically, the present invention concerns co-continuous polymer blends through the percolation-in-percolation approach or multiple percolation comprising conducting material wherein the polymers are crosslinked through various means.

BACKGROUND OF THE INVENTION

The ability of polymers to act as electrical insulators is the basis for their widespread use in the electrical and electronic fields. However, material designers have sought to combine the fabrication versatility of polymers with many of the electrical properties of metals. There are instances when an increased conductivity or relative permitivity of the polymer is warranted, such as in applications which require antistatic materials, low-temperature heaters, electromagnetic radiation shielding and electric field grading. A few select polymers, such as polyacetylene, polyaniline, polypyrrole and others, can be induced to exhibit intrinsic electronic conductivity through doping, though these systems tend to be cost prohibitive and difficult to fabricate into articles.

Conductivity may be imparted to a polymer through the creation of conducting polymer composite materials. Electronic conducting polymer composite materials require a random distribution of a conducting filler to be dispersed throughout an insulating polymer which results in a infinite network capable of supporting electron flow. A material is considered conducting when its volume resistivity drops below about $10^8$ Ω·cm to about $10^6$ Ω·cm. When conducting filler in a polymer is distributed at a volume level sufficient to support electron flow in a polymer/conducting filler blend, a continuous conducting network exists in the polymer.

Percolation theory is relatively successful in modeling the general conductivity characteristics of conducting polymer composite materials by predicting the convergence of conducting particles to distances at which the transfer of charge carriers between them becomes probable. The percolation threshold which is defined as the lowest concentration of conducting particles at which continuous conducting chains are formed, e.g., when a continuous conducting network is generated, is easily determined from the experimentally determined dependence of conductivity of the conducting polymer composite material on the filler concentration. For a general discussion on percolation theory, see the October 1975 Vol. 45, No. 4, Review of Modern Physics article, entitled, *Percolation and Conduction*, the contents of which are herein incorporated by reference. Much work has been done on determining the parameters influencing the percolation threshold with regard to the conducting filler material. See for example, *Models Proposed to Explain the Electrical Conductivity of Mixtures Made of Conducting and insulating Materials*, 1993 Journal of Materials Science, Vol. 28; *Resistivity of Filled Electrically Conducting Crosslinked Polyethylene*, 1984 Journal of Applied Polymer Science, Vol.29; and *Electron Transport Processes in Conductor-Filled Polymers*, 1983 Polymer Engineering and Science Vol. 23, No. 1; the contents of each of which are herein incorporated by reference.

Conducting composite polymer materials may be created through a "percolation-within-percolation" approach. For example, two immiscible polymers can be identified; the α-polymer which is selectively filled with a conducting filler, and the β-polymer which is to be filled with the α-polymer conducting filler blend. Denoting the critical weight fraction, or percolation threshold, of the conducting filler required to insure conductivity in the α-polymer as $p_\alpha$ and the critical weight fraction or percolation threshold of the α-phase required to insure conductivity of the a polymer/conducting filler blend in β as $p_\beta$, the critical weight fraction or percolation threshold of the conducting filler in the total ternary blend can be calculated based on the following mathematical equation:

$$P_c = P_\alpha P_\beta \tag{1}$$

Extending the approach to higher levels of percolation, the critical weight fraction or threshold of the conducting filler in the blend can be calculated based on the following mathematical equation.

$$p_c p_\alpha p_\beta \cdots p_{n-1} P_n \tag{2}$$

Where $p_n$ is the percolation threshold of co-continuity of the (n−1)-polymer blend in the n-polymer, and allows, at least theoretically, for the feasibility to obtain a conducting composite with as low a level of conducting filler as desired via multiple percolation. This "multiple percolation" approach to forming conducting polymer composites has been reported in the scientific literature, see for example *Multiple Percolation in Conducting Polymer Blends*, 1993 Macromolecules Vol. 26, the contents of which is herein incorporated by reference.

Applications of the heretofor described alternatives for reduction of conducting filler content in conducting polymer composite materials have been reported for polyethylene/polystyrene immiscible blends and for polypropylene/polyamide immiscible blends, both employing carbon black as the conducting filler. See for example, *Design of Electrical Conducting Composites: Key Role of the Morphology on the Electrical Properties of Carbon Black Filled Polymer Blends*, 1995 Macromolecules, Vol. 28 No. 5 and *Conducting Polymer Blends with Low Carbon Black Loading: Polypropylene/Polyamide*, 1996 Polymer Engineering and Science, Vol. 36, No. 10, the contents of both of which are herein incorporated by reference.

SUMMARY OF THE INVENTION

The present invention is a crosslinked conducting polymer blend or crosslinked conducting polymer composite as the two terms can be used interchangeably to generally describe the invention, and specifically a blend generated through percolation theory. The percolation results in conducting polymer blends that take advantage of the fill potential of reduction of conducting filler content. Conducting polymer blends heretofor known in the art fail to take advantage of multiple percolation to generate crosslinked blends with reduced conducting filler requirements.

In particular, conducting polymer composites that are crosslinked are advantageous when the composite will be placed in environments where exposure to chemicals could solvate and deteriorate a thermoplastic version of the composite, or in high temperature environments, where the composite may be exposed to temperatures exceeding the melting temperature of the composite constituents. For example, insulation shields and conductor shields in power cables are typically crosslinked conducting polymer composites.

Crosslinking thermoplastics conventionally used for insulations shields generally results in losses in the conducting properties. In some instances there may be a complete loss of conductivity after crosslinking. Conductivity may only be restored with increased conducting filler content. In order for a conventional crosslinked thermoplastic to achieve the same conductivity as the crosslinked blends of the present invention, the amount of conducting filler in the conventional crosslinked thermoplastic may be as high as about 10% to about 20% greater than the amount of filler material required in the present invention.

Power cables typically include a core electrical conductor, an overlaying semiconducting shield, an insulation layer formed over the semiconducting shield, and an outermost insulation shield. The semiconducting shield is used to screen the electrical conductor. The volume resistivity of conductor shields is specified to be less than or equal to 1000 $\Omega \cdot m$, and less than or equal to 500 $\Omega \cdot m$ for insulation shields, by the Insulated Cable Engineering Association (ICEA) in their ICEA-S-68-576 Standard.

Current polymer compounds used in the role of a semiconducting insulation or conductor shields use a large weight percentage of carbon black component to incur a high level of conductivity (or low level of resistivity), to the compound. The required high loadings of the carbon black are a result of the problem of generating a conducting network throughout the mixture that is infinite in cluster size.

Weight percentage of conducting filler, such as carbon black, in a conducting polymer composite is a crucial aspect of the properties of the composite and cost. High quantities of conducting filler result in a composite material with poor mechanical properties that is difficult to process and has a high cost. Thus minimizing the amount of conducting filler while maintaining the conducting network is essential. The crosslinked conducting polymer blends of the present invention allow fill benefit of reduced conducting filler content while allowing the beneficial properties of crosslinking herein described with minimal, if any, loss in conductivity.

U.S. Pat. No. 5,556,697 which is incorporated herein by reference, provides a discussion of prior art semiconducting shields, all of which employ large weight percentages of carbon blacks of various types, and their delinquencies. Some of these delinquencies are: poor dispersion of the carbon black in the base resin, resulting in the formation of water trees and premature cable failure; high viscosity of the compound, resulting in abrasion and corroding of cable extrusion equipment and shrinkback.

The present invention is a crosslinked conducting polymer composite which utilizes aspects of the "double percolation" or percolation-within-percolation, and multiple percolation approaches which are described in U.S. application Ser. No. 09/113,963 entitled Conducting Polymer Composite Materials and Methods of Making Same and Ser. No. 09/113,914 entitled Semiconducting Jacket for Cable and Cable Jacketed Therewith; both filed on Jul. 10, 1998 by the same applicant. The aforementioned applications concern thermoplastic conducting polymer composites with reduced conducting filler content. The present invention is concerned with thermoset or crosslinked conducting polymer composites employing the percolation-within-percolation or multiple percolation approaches to generating continuous conducting networks in polymers, and to reducing the percolation threshold required to generate such networks through proper choice of constituents and processing approaches thereby reducing the amount of conductive filler required to establish a continuous conducting network.

In accordance with the present invention, crosslinked conducting polymer composite materials and the methods of making same are provided. The crosslinked conducting polymer composite materials of the invention have good conductivity while reducing the conducting filler content. In the present invention the amount of conducting filler can be reduced to an amount equal to or greater than that required to generate a continuous conducting network in the minor phase polymer and then, upon percolation-in-percolation or multiple percolation, in any major phase polymer. The amount of conducting filler may be preferably reduced equal to or less than about 12% by weight of the total composite and preferably equal to or less than about 6% by weight of the total composite, depending, for example, on the final application or conductivity requirements for such application and the properties of the conducting filler material. Correspondingly, the rheology of the melt phase of the composite material of the present invention will more closely follow the rheology of the composite material without conducting filler material as a result of the reduction of the reinforcing conducting filler content, thereby increasing the ease of processing the material.

The present invention provides crosslinked conducting polymer composites comprised of an immiscible polymer blend containing a conducting filler preferentially located in one phase. The blend is formed by at least three primary components: (1) a conducting filler (e.g. carbon black, graphite, metallic filings, intrinsically conducting polymers, etc.) which is any material that permits the transfer of electrons, (2) a minor phase polymer in which the conducting filler is dispersed to form a binary composite and (3) at least one major phase material in which the conducting filler/minor phase blend, binary composite, is dispersed. Further, additional major phase materials may be added to the immiscible polymer blend. Materials may also be added to the blend or utilized in processing the composite blend which assist in bringing about the crosslinking of polymer in the composite blend.

Percolation theory can be employed to design conducting composite materials of the present invention. The level at which a minor phase is just sufficiently incorporated volumetrically into a major phase where both phases are co-continuous is termed the "percolation threshold", that is the lowest concentration of conducting particles needed to form conducting chains, e.g., a continuous conducting network, when incorporated into another material. The percolation threshold may also be referred to as the critical weight fraction. In a binary system, a conductive material in the form of non-associating conducting spheres, when dispersed in another phase material, must be in excess of about 16% by volume of total composite material to generate an infinite network. The volume of minor phase material necessary to generate an infinite network is dependent on the geometry of the conducting filler particles, (i.e. the surface area to volume ratio of the particle) and will vary greatly with the type of filler. In accordance with the present invention it has been found that by altering the morphology of the minor/major phase through selection of materials and processing approaches, a significant reduction in percolation threshold can be realized and employed in a percolation-within-percolation approach to producing conducting polymer composites. Further, it has been found that these conducting polymer composites can be crosslinked without suffering a significant loss in conductivity.

With respect to the ternary systems of the present invention, a percolation threshold is achieved when forming the binary phase through combining the minor phase polymer and conducting filler. A percolation threshold is also subsequently achieved when forming the composite through combining the minor phase polymer/conducting filler blend with the major phase. The multiple percolation theory is also useful in making conducting composite materials with more than three phases such as quaternary composite systems with multiple percolation theory wherein separate percolation thresholds are achieved each time a prior composite phase is blended with subsequent major phases. Because the separate polymers and/or polymer conducting filler composite remain co-continuous through blending in quantities which achieve, at least, the percolation threshold, a continuous conducting network will exist in the composite material. As such, the amount of conducting filler is significantly reduced and the crosslinking permits the composites of the present invention to be used in conditions and environments that require the mechanical strength and integrity of crosslinked polymers. Heretofore such crosslinked materials required larger quantities of conductive filler to maintain a conductive network.

The crosslinked conducting polymer composite materials having good conductivity with a significant reduction of conducting filler content of the present invention are comprised of a conducting filler dispersed in a semicrystalline minor phase polymeric material in an amount which is at or just exceeds the percolation threshold, forming a binary composite; the binary composite being mixed and dispersed in at least one major phase polymeric material in an amount which is at or just exceeds the percolation threshold in the major phase material to generate. a continuous conducting network, forming a ternary composite which is an immiscible blend having co-continuous phases; and means for crosslinking the composite which can employ chemicals and catalysts to bring about the crosslinking of the semicrystalline polymeric materials and other polymers in the composite. The major and minor phase materials must be such that when mixed, the major phase material and minor phase material will not engage in electrostatic interactions which promote miscibility. Other embodiments of the present invention involve multiple percolation, that is employing additional major phases and mixing conducting composites obtained through prior percolation procedures at or above the percolation threshold of the conducting composite materials in the next most major phase.

It is one object of the present invention to reduce conducting filler content necessary in the composite to exceed the percolation threshold by material selection. This object is accomplished by requiring the minor phase material to be semicrystalline and the composite to be an immiscible blend. In a binary mixture of a semicrystalline polymer and a conducting filler, the filler particles are rejected from the crystalline regions into the amorphous regions upon recrystallization, which accordingly decreases the percolation threshold. Similarly, using a polymer blend with immiscible polymers results in dual phases as the matrix in conducting composite material promotes phase inhomogeneities and lowers the percolation threshold. The conducting filler is heterogeneously distributed within the polymers in this latter example. In the present invention, the two phases are co-continuous and the filler is preferably in the minor phase or more preferably at the interface. The conducting filler resides in a minor phase of the immiscible blend; the minor phase being a semicrystalline polymer having a relatively high crystallinity, between about 20% and about 80%, and preferably greater than or equal to about 70%, thereby causing the conducting filler aggregates to concentrate in amorphous regions of the minor phase or at the interface of the continuous minor and major phases.

The selection of materials should be such that favorable phase morphology, that is phase separation, develops between the phases (i.e. between the major and minor phases for a ternary system). Proper phase separation develops when the polymers selected for the composite material are such that the minor phase and major phases, do not engage in electrostatic interaction that promote miscibility thus resulting in a negative enthalpy of mixing. If the phases engage in electrostatic interaction, this interaction must be such that it does not promote miscibility of the polymer phases. The selection of materials that are immiscible results in co-continuity of the phases in the composite material which supports a continuous conducting network with reduced conducting filler material.

The material chosen for the conducting filler in any of the embodiments of the present invention influences the amount of conducting filler required to meet or exceed the percolation threshold to form a continuous conducting network in the minor phase. The conducting filler may be any suitable material exhibiting conductivity and should have a chemical structure which results in an inherently high conductivity and affinity to develop a strong network. The conducting filler material may selected from the group consisting of carbon black, graphite, metallic particles, intrinsically conducting polymers, carbon fibers, and mixtures thereof.

A second object of the present invention is to reduce the conducting filler content necessary in the composite to exceed the percolation threshold by employing more than one major phase material. By dispersing, for example, a conducting ternary composite of immiscible blend having co-continuous phases in a second major phase material in an amount sufficient to meet or exceed the percolation threshold required to generate a continuous conducting network, a quaternary conducting polymer composite of an immiscible blend having co-continuous phases is formed with further reduced conducting filler content as long as the criteria for a major phase material heretofore described are met. This process can be repeated an infinite number of times to reduce conducting filler content in the total composite and/or to tailor the final composite to a specific application. This process can be termed "multiple percolation" variation to the percolation-within-percolation approach. When the process is repeated, e.g. multiple percolation is conducted, the last major phase used, e.g. the polymer with which the conducting composite is blended, is the most major phase.

A third object of the present invention is crosslinking polymers in the composite materials. Crosslinking can be accomplished by a number of means. For example, choosing semicrystalline components for the minor and major phases of the composite to create a physical crosslink in the composite due to the crystalline structure of the constituent chains; irradiating the composite with γ-radiation or β-radiation; copolymerization or grafting a hydrolyzable group on the major phase which will effect chemical crosslinking of the final composite when the composite is subjected to moisture; or by chemical crosslinking with the addition of a peroxide to the major phase, which peroxide decomposes at elevated temperatures thereby generating free radicals which effectuate crosslinking of polymer in the conducting composite blend.

A fourth object of the present invention is to reduce conducting filler content necessary in the composite to exceed the percolation threshold by processing the composite material through chemical or physical means, including, for example, annealing. It is found that annealing the semicrystalline polymer and conducting filler can further increase the crystalline phase and result in a lower percolation threshold for the binary composite, thereby reducing the amount of conducting filler required for a continuous conducting network. Annealing the final composite also reinforces the phase separation between minor phase and major phases and thereby enhancing the conducting network in the crosslinked conducting polymer composite.

Optimizing the surface area to volume ratio of the binary composite prior to mixing with major phase material also lowers the percolation threshold necessary to generate a continuous conducting network. Surface area to volume ratio of the binary composite can be optimized, for example, by extruding the binary composite into threads or, pulverizing the binary composite prior to mixing with the major phase, and mixing the extruded or pulverized binary composite with major phase material at a temperature lower than the melting temperature of the binary composite.

Other objects, features and advantages of the present invention will be apparent from the following detailed description of the preferred embodiments.

DETAILED DESCRIPTION OF THE INVENTION

Conducting crosslinked polymer composite materials having good conductivity with significant reduction of conducting filler content of the present invention are based on the conducting filler dispersed in a minor phase semicrystalline polymer material, forming a binary composite, the binary composite being mixed with at least one major phase polymeric material and a means employed to crosslink the polymers. More specifically, the present invention may be achieved by adhering to the hereinafter discussed general principles and hereinafter described embodiments. (1) The conducting filler content is preferably at or just greater than the percolation threshold in the minor phase material (i.e. the lowest concentration of conducting filler content required to generate a continuous conducting network in the minor phase material); (2) the minor phase content is at or just greater than the percolation threshold in the major phase material (i.e. the lowest concentration of minor phase material required to generate a continuous conducting network in the major phase material); (3) the minor phase material must be semicrystalline; (4) the major/minor phase blend must be immiscible having distinct co-continuous phases; (5) the polymers must be crosslinked as herein described.

In accordance with the present invention, the significant reduction of conducting filler content is provided by requiring the conducting filler to be dispersed in the minor phase material comprising a semicrystalline polymer in an amount sufficient to be equal to or greater than an amount required to generate a continuous conducting network in the minor phase material, that is the conducting filler is dispersed in the minor phase in an amount to be greater than or equal to the percolation threshold, thereby forming a binary composite. Further, the minor phase in the form of the binary composite is dispersed in a major phase material in an amount sufficient to be equal to or greater than an amount required to generate a continuous conducting network in the major phase material, the major phase material being a polymer which when mixed with the minor phase material will not engage in electrostatic interactions that promote miscibility, thereby forming a conducting immiscible ternary composite having co-continuous phases. In certain embodiments of the present invention each composite material formed by mixing a conducting polymer composite may be further mixed with subsequent major phases at an amount equal to or greater than the amount required to generate a continuous conducting network in such subsequent major phase materials, the subsequent major phase materials being polymer which when mixed with the composites will not engage in electrostatic interactions that promote miscibility, thereby forming an immiscible composite having co-continuous phases through multiple percolation. Thus a conducting polymer composite material with a reduced conducting filler content, which may be less than or equal to about 12% by weight conducting filler material based on total weight of the conducting polymer composite and preferably less than or equal to about 6% by weight conducting filler material based on total weight of the conducting polymer composite is provided; which has a volume resistivity of less than about $10^8$ $\Omega \cdot$cm, and preferably a volume resistivity of about less than $10^6$ $\Omega \cdot$cm, depending on the conducting filler material chosen and the requirements for the conducting polymer composite in a specific application.

The material chosen for the conducting filler in any of the embodiments of the present invention influences the amount of conducting filler required to meet or exceed the percolation threshold required to form a conducting network when dispersed in the minor phase material. The conducting filler material may be any suitable material exhibiting conductivity and should have a chemical structure which results in an inherently high conductivity with an affinity to develop a strong network.

The conducting filler may be selected from the group consisting of carbon black, graphite, metallic particles, intrinsically conducting polymers, carbon fiber, fullerenes, carbon nanotubes and mixtures thereof. In particular, the carbon black may be an "acetylene black" or a "furnace black" or any commercial grade of conducting carbon black, the acetylene blacks being superior in producing conducting blends. Exemplary carbon blacks are also disclosed in U.S. Pat. No. 5,556,697, the contents of which are herein incorporated by reference. "Furnace blacks" are lower quality carbon blacks and are inferior in their ability to produce conducting blends when compared to "acetylene blacks", which are fabricated from the pyrolysis of acetylene. "Acetylene blacks" being more costly than furnace blacks are preferred in the present invention over other carbon black materials when low carbon black content is preferred over price. However, as can be seen from Working Examples 1, 2 and 3, "furnace blacks" are satisfactory in producing conducting polymer composites of the present invention.

Intrinsically conducting polymers, such as polyacetylene, polyaniline, polypyrrole, mixtures thereof, and the like, are also preferable for optimizing the reduction of conducting filler in the present invention. The intrinsically conducting polymers are generally more costly than carbon blacks, but often have greater conductivity than many carbon blacks. Thus, the present invention which reduces the amount of filler material needed for an acceptable conducting composite insulating material permits the use of intrinsically conducting polymers when, heretofore, such use could be cost prohibitive. Additionally, carbon fibers or "whiskers" may be employed, as the amount of carbon fibers by weight percent required to exceed the percolation threshold may be equal to or even less than that of the other described suitable conducting fillers.

The minor phase material must be a semicrystallinepolymer. Suitable minor phase materials have a crystallinity of about 20% to about 80%, and preferably greater than or equal to about 70% based on the heat of fusion of a perfect crystal. Suitable minor phase materials include any semicrystalline homopolymer or copolymer which can be induced to exhibit semicrystallinity, such as, but not limited to, low density polyethylene (LDPE), high density polyethylene (HDPE), medium density polyethylene (MDPE), linear low density polyethylene (LLDPE), polypropylene (PP), poly-1-butene, poly(styrene) (PS), polycarbonate (PC), poly (ethylene terephthlate) (PET), poly(hexamethylene adipamide) (nylon-6,6), poly(e-caprolactam) (nylon-6), and mixtures thereof.

One skilled in the art would recognize that the level of a minor phase material content required to meet or exceed the percolation threshold in any given major phase material is dependent on the conducting filler and the major phase material(s) and the description and examples set forth herein should serve as a guide. For example, it has been found that for an immiscible polymer blend having furnace grade carbon black as the conducting filler, HDPE as the minor phase, and poly(ethylene-co-vinylacetate) (EVA) as the major phase material, the vinyl acetate content of the EVA being about 45% by weight, that the HDPE/carbon black blend should be greater than or equal to about 35% by weight of the total composite to result in a conducting immiscible composite.

Suitable major phase materials may be any polymeric material which meets the heretofor described criteria for not engaging in electrostatic interactions that promote miscibility in relation to the heretofor described minor phase materials. Minor electrostatic interactions are permissible provided, however, such interactions do not promote miscibility. Thus, the minor phase/major phase(s) blend must be immiscible. Suitable materials for the major phase materials may include, but are not limited to, for example, EVA, polybutylene lerphthalate (PBT), PS, poly(methyl methacrylate) (PMMA), HDPE, LLDPE, LDPE, MDPE, PP, polyisobutylene, poly(vinyl chloride) (PVC), poly (vinylidene chloride), poly(vinylidene fluoride) (PVDF), poly(tetrafluoroethylene) (PTFE), poly(vinyl acetate) (PVAc), poly(methyl acrylate), polyacrylonitrile, polybutadiene, PET, poly(8-aminocaprylic acid), nylon-6,6, poly(vinyl alcohol) (PVA), and mixtures thereof.

One skilled in the art will recognize that the selection and amount of major phase material employed is also dependent upon other constituents of the composite, and the description and examples set forth herein should serve as a guide. Exemplary major/minor phase pairs may include, but are not limited to minor phase materials comprising one or more of HDPE, LLDPE, MDPE, LDPE, and poly-1-butene paired with major phase materials comprising one or more of EVA, PS, PVC, poly(vinylidene chloride), PTFE, PVAc, PMMA, polyacrylonitrile, polybutadiene, PET, poly(8-aminocaprylic acid) and nylon-6,6. Similarly, minor phase materials comprising one or more of PS, PC, nylon-6,6 and nylon-6 may be paired with major phase materials comprising one or more of HDPE, LLDPE, MDPE, LDPE, PP, and polyisobutylene.

In one embodiment of the crosslinked conducting polymer composite, the crosslinking occurs through selection of materials in the minor phase and major phase to achieve a physical crosslink of the polymers. That is the minor phase material comprising a semicrystalline polymer with a crystallinity of about 20% to about 80% and the major phase material comprising a second semicrystalline polymer having a crystallinity of about 20% to about 80%, such that a physical crosslink occurs in the conducting polymer composite. For example, a minor phase material comprising HDPE having a crystallinity of up to about 80% and a major phase comprising nylon-6,6 having a crystallinity of up to about 72% when mixed according to the present invention will effect physical crosslinking. Or, for example, a minor phase material comprising HDPE and a major phase material comprising EVA with a low vinyl acetate content (less than about 28% by weight) will promote crystallinity in the ethylene sections of the copolymer while still retaining a sufficient quantity of the vinyl acetate to maintain immiscibility with the HDPE, effecting a physical crosslink of the conducting polymer composite. It will be apparent to one skilled in the art that other materials suitable for conducting polymer composite materials will physically crosslink.

In a second embodiment of the crosslinked conducting polymer composite of the invention, the crosslinking can be achieved by exposing the conducting polymer composite to β- or γ-radiation for a sufficient time to effect crosslinking of the composite.

In a third embodiment of the crosslinked conducting polymer composite the crosslinking can be achieved by grafting a hydrolyzable group onto the major phase material prior to dispersing the minor phase material therein, such that the conducting polymer composite will crosslink on exposure to moisture. In one alternative to this approach, the major phase material may be a commercially available copolymer which contains a hydrolyzable functionality as part of the copolymer backbone. For example, polyethylene-co-vinyl silanes are suitable commercially available major phase materials available from Union Carbide Corporation as DFDA 5451 and from AT Plastics as AQUA-LINK™ 910 and 920. In another alternative to this approach, a hydrolyzable co-polymer may be created during the mixing process of producing the conducting polymer composite, by grafting an unsaturated moiety containing one or more hydrolyzable functionalities such as, members of the homologous series of $Si(OR)_3$ such as vinyltriethoxysilane, vinyltris(2-methoxyethoxy)silane, or preferably vinyltrimethoxysilane (VTMO), to the major phase polymer back bone prior to dispersing the minor phase in the major phase. The grafting reaction may for example be initiated by use of a peroxide such as t-butyl peroxide, or preferably dicumyl peroxide (DCP), or others as known in the art. The crosslinking is accomplished in moisture in the presence of a catalyst such as dioctyltin maleate, dibutyltin diacetate, stannous acetate, lead naphthalate, zinc caprylate, or preferably dibutyltin dilaurate (DBTL) which can be added to the major phase material during grafting.

In a fourth embodiment of the crosslinked conducting polymer composite, the chemical crosslinking can be achieved by adding an organic peroxide such as DCP; 2,5-dimethyl-2,5-di(t-butylperoxy)hexane; t-butyl cumyl peroxide; 2,5-dimethyl-2,5-di(t-butylperoxy)hexyne-3 or others to the major phase material prior to the dispersion of the minor phase. The peroxide will decompose at elevated temperatures as the major phase is mixed with the minor phase. Such decomposition generates free radicals that react with the polymers in the major phase and minor phase and crosslink the polymers.

In accordance with the present invention, in order to further reduce the conducting filler content needed in the conducting polymer composite and/or to tailor the composite to a specific application, the conducting polymer composite may further comprise a second major phase material wherein the conducting ternary composite is dispersed in an amount sufficient for the ternary composite to be continuous within the second major phase, and the second major phase material being selected from that group of polymers which when mixed with the ternary composite, will not engage in electrostatic interactions that promote miscibility with the minor phase material or the with the major phase material, thus forming a immiscible quaternary conducting composite having co-continuous phases. The quaternary composite is crosslinked as heretofor discussed. The quaternary composite has preferably less than about 5% by weight conducting filler content with respect to the total quaternary composite weight, yet forms a continuous conducting network in the composite due to the multiple percolation of the quaternary composite. For example, a quaternary composite of the present invention could be formed with a conducting filler of a "furnace black" type carbon black dispersed in a minor phase of HDPE; the carbon black comprising about 3.6% by weight of the quaternary composite and the HDPE comprising about 26.4% by weight of the quaternary composite; the major phase material being EVA in the amount of about 30% by weight of the quaternary composite; and the second major phase material being PS in the amount of about 40% by weight of the quaternary composite. Or for example, to produce a physically crosslinked quaternary composite, using carbon black as the conducting filler, the minor phase may be EVA with a low vinyl acetate content (less than about 25%), the major phase material may be nylon-6,6, and the second the major phase may be HDPE. Of course other combinations meeting the requirements of the present invention will be apparent to those skilled in the art.

In a like manner, crosslinked conducting polymer composites of the present invention can be formed with more than two major phase materials to form multi-phase immiscible conducting polymer composites. In that event, the last major phase material used to form multi-phase immiscible conducting polymer composite is called the most major phase. The requirements for selection of the additional major phase materials are the same as for the quaternary composite heretofor described. That is, additional major phase materials must be selected such that when mixed with conducting polymer composites will not engage in electrostatic interactions that promote miscibility with the minor phase material, the major phase material, or the second major phase material or any higher order major phase material as the case may be, such that an immiscible polymer blend with co-continuous phases is formed. Further, the amount of the conducting polymer composite dispersed in the additional major phase materials must be sufficient to be continuous within the additional major phase materials.

One skilled in the art will recognize that the amount of ternary, quaternary or higher order composite sufficient for the ternary, quaternary or higher order composite to be continuous in additional major phase materials is dependent upon the constituents of the composite system and may be determined experimentally by measuring volume resistivity as a function of ternary or quaternary composite content to ensure that the final composite is conducting. It also should be noted that for quaternary and blends having more than 2 major phases, that all primary constituents, (i.e. conducting filler, minor phase material, and major phase materials) must be mutually insoluble for the temperature and conditions of the composite use.

Crosslinking of quaternary conducting polymer composites and multi-phase immiscible conducting polymer composites may be accomplished in general by the means heretofor described for ternary conducting polymer composites. The polymers in all of the phases that comprise the composite may be crosslinked or crosslinking may occur between the most major phase and the composite material that is blended into the most major phase. However, it is important to note that the grafting of hydrolyzable groups or the addition of organic peroxides for crosslinking, for example, should be preferably done in the second major phase or most major phase, respectively, for quaternary conducting polymer composites and multi-phase immiscible conducting polymer composites.

In accordance with the present invention, other additives may be included in any of the heretofor described embodiments in order to enhance physical or other properties depending on the ultimate application for the conducting polymer composite. For example, typical additives which can be introduced into the composite formulation may be: nucleating agents, antioxidants, coupling agents, ultraviolet absorbers or stabilizers, pigments, dyes, reinforcing fillers or polymer additives, slip agents, plasticizers, processing aids, lubricants, viscosity control agents, tackifiers, anti-blocking agents, surfactants, extender oils, metal deactivators, voltage stabilizers, flame retardant fillers and additives, crosslinking agents, boosters and catalysts and smoke suppressants. Fillers and additives can be added in amounts ranging from less than about 0.05 weight percent to more than about 50 weight percent of the total composite. The amount of the additives in the composite will correspondingly decrease the weight percent of other constituents required in the composite to maintain the properties described in the current invention.

Examples of nucleating agents are talc, silica, mica, kaolin and the like. Examples of antioxidants are: hindered phenols such as tetrakis[methylene (3,5-di-t-butyl-4-hydroxyhydrocinnamate)]-methane, 4,4'-thiobis(2-methyl-6-tert-butylphenol), and thiodiethylene bis(3,5-di-tert-butyl-4-hydroxy)hydrocinnamat, phosphites and phosphonites such as tris(2,4-di-tert-butylphenyl)phosphite and thio compounds such as dilaurylthiodipropionate, dimyristylthiodipropionate, and distearylthiodipropionate, various siloxanes, and amines such as polymerized 2,2,4-trimethyl-1,2-dihydroquinoline and the like. Antioxidants can be used in amount of about 0.05 weight percent to about 2 weight percent of the total composite.

In accordance with further embodiments of the present invention, methods of producing a conducting crosslinked polymer composite are provided, including several embodiments to reduce the amount of conducting filler required to generate a continuous conducting network in the binary composite and thus in the final composite through processing approaches.

In a first method of producing the crosslinked conducting polymer composite of the present invention, a semicrystalline polymer having a melting temperature is mixed by a conventional mixer, wherein the mixer is preheated to at least the melting temperature of the semicrystalline polymer. A conducting filler is added to the semicrystalline polymer in the mixer in an amount greater than or equal to the percolation threshold which is an amount required to generate a continuous conducting network in the semicrystalline polymer. The conducting filler and the semicrystalline polymer are mixed for a time and at a sufficient speed to insure uniform distribution of the conducting filler in the semicrystalline polymer, thereby forming a conducting binary composite having a melting temperature. A major phase polymeric material having a melting temperature and selected such that when mixed with the binary composite will not engage in electrostatic interactions with the binary composite which promote miscibility, is mixed with the binary composite in a mixer for a time and at a sufficient speed to insure a uniform distribution of the binary composite in the major phase material such that a weight ratio of the binary composite to the major phase material is sufficient for the binary composite to be equal to or greater than the percolation threshold which is an amount required to generate a continuous conducting network in the major phase material. The mixer is preheated to at least the melting temperature of the binary composite and the major phase material, such that a conducting immiscible ternary composite with co-continuous phases is formed The ternary conducting composite material can be blended using the same mixer as used for the blending of the binary mixtures or a different mixer can be used. The ternary composite is crosslinked by means described herein.

One method of crosslinking the ternary composite according to the present invention, is accomplished by selecting the major phase material to have a crystallinity of between about 20% and about 80%, such that a physical crosslink is effected when the semicrystalline polymer of the binary composite, the minor phase, is mixed with the major phase material.

In a second method of crosslinking the ternary composite in accordance with the present invention, the crosslinking step comprises irradiating the ternary composite with β or γ-radiation, for a sufficient time to effect crosslinking of the composite.

In a third method of crosslinking the ternary composite in accordance with the present invention, the crosslinking step comprises grafting a hydrolyzable group, as discussed herein, onto said major phase material by adding, for example, a silane group, a catalyst, and an organic peroxide to the major phase material prior to mixing the major phase material and the binary composite, and thereafter exposing the ternary composite to moisture to crosslink the ternary composite.

In a fourth method of crosslinking the ternary composite in accordance with the present invention, the crosslinking step is accomplished by selecting the major phase material from commercially available copolymers which include a hydrolyzable functionality as part of the copolymer backbone, as discussed herein, and exposing the ternary composite to moisture to effect a chemical crosslink.

In a fifth method of crosslinking the ternary composite in accordance with the present invention, the crosslinking step comprises adding an organic peroxide to the major phase material prior to mixing the major phase material with the binary composite, whereby the ternary composite crosslinks over time. The organic peroxide is preferably added to the major phase material in a mixer before the binary composite is added to the mixer to allow the organic peroxide sufficient time to be absorbed by the major phase material before mixing the binary composite with the major phase material. Crosslinking is effected with the decomposition of the peroxide and subsequent generation of free radicals at elevated temperatures.

In one alternative, it has been found, as in Example 2, that if the crosslinking occurs too quickly, then the composite may have to go through a post-crosslinking heating process after compounding to induce phase separation and/or recrystallization, thereby making the composite conducting. In thermoplastic conducting immiscible composites of the present invention, before crosslinking and as described in U.S. application Ser. No. 09/113,963, annealing the conducting immiscible ternary composite results in morphological changes in the ternary composite, enhancing the conductivity. It has been found that the crystallinity of the minor phase increased by about 5% after a post-crosslink heating at 150° C. for 15 hours, which is most likely indicative of a reorganization in the minor phase. This may contribute to an increase of the conductivity of the composite. It has further been found that the post-crosslinking heating process is not necessary if the composite is heated to less than or equal to about 175° C. to induce phase separation before the crosslinking is completed.

The method of producing a crosslinked conducting polymer composite may further comprise mixing a second major phase material, or additional major phase materials, having melting temperatures with the composite material in a mixer preheated to about the melting temperatures of the second major phase material and of the ternary composite; or additional major phase materials and lower order composite; as the case may be, for a time and at a sufficient speed to insure a uniform distribution of the composite in the major phase material, such that a weight ratio of the composite to the major phase material is sufficient for the composite to be equal to or greater than the percolation threshold, which is an amount required to generate a continuous conducting network in the second or higher order major phase material. The major phase material is selected from that group of polymers which when mixed with the composite will not engage in electrostatic interactions which promote miscibility such that a conducting immiscible quaternary composite, or higher order composite, with co-continuous phases is formed. The incorporation of additional major phase materials can be referred to as multiple percolation. The composite is crosslinked by methods heretofor described. However, it is preferable that when chemically crosslinking the composite, inclusion of the hydrolyzable group or addition of the organic peroxide be done to the most major phase material.

The resulting composites of the present invention can be further enhanced to reduce conducting filler content by conventional annealing processes. Preferably, the annealing processes should be completed before crosslinking the composite or before the crosslinking is complete. That is, in accordance with a further embodiment of the present invention, the heretofor described ternary composite, quaternary composite and/or higher order composite may be annealed, thereby coarsening the morphology of the composite and resulting in a more conducting composite and/or increasing the crystallinity of the composite. For example, the percolation threshold may be further reduced by preferably annealing the final conducting polymer composite from approximately just above the melting temperature of both the minor phase and each major phase material(s). This results in reinforcing the phase separation between the binary composite, and the major phase(s) by coarsening the morphology of the composite thus resulting in a conducting polymer composite with a further reduced filler content and good conductivity.

Alternatively, according to the present invention, the percolation threshold of the conducting filler in the semicrystalline polymer may be reduced by annealing the binary composite before mixing with the major phase material. This annealing process will result in the threshold concentration for forming conducting networks in the binary composite to be lower. During the crystallization process, a major part of the conducting filler particles are rejected into interspherulitic boundaries and the remaining, conducting filler particles may be located in amorphous regions, resulting in a reduction in percolation threshold. Thus annealing of the binary composite refines and increases the crystalline phase. The binary composite may be annealed to below the binary composite's melting temperature prior to mixing the major phase material with the binary composite, wherein the major phase material has a melting temperature less than the binary composite's melting temperature. The major phase material and the binary composite being mixed at a temperature below the melting temperature of the binary composite. In a further embodiment of the present invention, a reduction of the percolation threshold of the binary composite in the major phase material may be achieved by modifying the surface area to volume ratio of the binary composite, before mixing the binary composite with the major phase material thereby increasing the binary acomposite's affinity to create a conducting network. This can be accomplished by pulverizing the binary composite, or more preferably by extruding threadlike structures of binary composite by conventional extrusion techniques prior to mixing the binary composite with the major phase material. The threadlike structures of binary composite may for example be about 2 mm long and about 0.25 mm in diameter.

It is therefore apparent that in applications for conducting polymer composite materials requiring very high conductivities, (resistivities of about $p \leq 10^3$ $\Omega \cdot cm$), conducting filler content above the reduced percolation threshold may be employed using the methods of the present invention to produce conducting polymer composite materials of the present invention.

The principles of the invention can be further illustrated by the following non-limiting examples which demonstrate embodiments of the invention. As will be apparent to one skilled in the art, the examples do not represent the limit of embodiments of the present invention.

WORKING EXAMPLE 1

A crosslinked conducting polymer composite having reduced conducting filler content was made according to the present invention using commercial grades of a random copolymer of EVA, HDPE, and furnace grade carbon black (CB). The crosslinking means of the present example were accomplished by grafting a hydrolyzable group, VTMO, onto the backbone of the major phase material, EVA, during the mixing process of the major phase and subsequently exposing the composite to moisture. The characteristics of the materials used in this example are set forth in Table 1.

TABLE 1

| Constituent | Amount (w/w) | Tradename | Characteristics | Producer |
|---|---|---|---|---|
| EVA | 49.768 | Elvax 265 | 28 weight % VA content | Du Pont |
| HDPE | 43.790 | Petrothene LS6081-00 | density = 0.963 g/cm³ | Millennium Chemical |
| carbon black | 5.978 | Vulcan XC72 | $N_2$ Surface Area = 254 m²/g DBP oil absorption = 174 cm³/100 g mean particle diameter = 300 Ångstroms | Cabot Corp. |
| VTMO/DCP/DBTL | 0.464 | Dynasylan Silfm 06 | Hydrolyzable group (VTMO); a peroxide (DCP); and a condensation catalyst (DBTL) | Sivento |

All composites were mixed in a Brabender Banbury mixer with a 300 cm³ cavity using a 72 RPM (200 s⁻¹ shear rate). The mixing procedure for producing the binary composite comprises preheating the mixer to 170° C.; measuring out 200 grams of HDPE and 27.3 grams of the carbon black; adding half of the HDPE to the preheated rotating mixer; then adding the remaining half of the HDPE in two stages to the rotating mixer as the HDPE softened; then mixing the HDPE in the mixer for 6 minutes; adding the carbon black to the mixing HDPE; and mixing the HDPE/CB blend for 9 minutes. The mixer was then turned off and the binary composite (HDPE/CB blend), was removed from the mixer while the binary composite was still hot. After the binary composite cooled to ambient room temperature, the binary composite was comminuted into pieces having approximately 0.75" maximum major axis.

The mixing procedure for producing the ternary conducting polymer composite comprises: measuring out 100 grams of the EVA, 100 grams of the HDPE/CB blend, and 0.933 grams of VTMO/DCP/DBTL crosslinking system, preheating a mixer to 140° C., adding the EVA to the preheated rotating mixer; then mixing the EVA in the mixer for 30 seconds, adding the crosslinking system, the hydrolyzable group, peroxide and catalysts to the EVA in the mixer as the temperature of the EVA began to rise, preheating the HDPE/CB blend to approximately softening point in order to facilitate mixing; mixing the crosslinking system with the EVA for approximately 1.5 minutes, which allows the crosslinking system to be absorbed into the EVA, adding the preheated HDPE/CB blend to the EVA in the mixer once the temperature of the EVA reached 130° C., and mixing the HDPE/CB/EVA blend for an additional 5 minutes. The mixer was then shut down and the ternary composite was removed from the mixer while still hot. The ternary composite was cooled, then comminuted into approximately 0.75" pieces and molded into 0.075" thick plaques using between about 40 grams to about 50 grams of material for each plaque.

Crosslinking was accomplished by immersing the aforesaid composite material plaques in dionized water for 15 hours at 80° C. The plaques were then taken out of the water and placed in a vacuum oven at 75° C. for 2 hours to dry the excess water. Some of the samples were not crosslinked so that these could be tested as described below for comparison purposes.

The ternary conducting composite as prepared in Example 1 was tested and measured for volume resistivity. Testing and measurement were performed on both crosslinked and non-crosslinked samples. Strips of the conducting polymer composite material were cut from the molded plaques and colloidal silver paint was used to fabricate electrodes 50 mm apart along the strips in order to remove the contact resistance. A Fluke 25 Series II digital multimeter and a 2 point technique were used to measure the electrical resistance of the strips.

Table 2 sets forth the volume resistivity measured for both crosslinked and non-crosslinked strips of conducting polymer composite. The volume resistivity is adequate for both the crosslinked and non-crosslinked material. However, as demonstrated in Table 2, crosslinking did not diminish or significantly decrease the conductivity of the material. This can be contrasted to thermoplastics know in the art wherein crosslinking can diminish or decrease conductivity for composite materials with low volumes of conducting filler.

TABLE 2

| sample | volume resistivity ($\Omega \cdot cm$) |
|---|---|
| composite before crosslinking | 1007.6 ± 115.2[a] |
| composite after crosslinking | 1780.6 ± 208.4[a] |

[a]68% confidence limits

It should be noted that in the present example that certain preparation steps, for example, comminuting the binary composite and preheating the binary composite prior to mixing with the EVA, were performed to facilitate the mixing process which in turn effects the time and speed for mixing. As such, these steps are not essential to formulate the conducting polymer composite of the present invention provided the constituents are mixed for a time and at a speed sufficient to ensure co-continuous uniform distribution such that a continuous conducting network is established.

Additionally, while it is important to add the crosslinking system to the major phase material, it is not important to add the crosslinking system when the temperature of the major phase is rising, as the crosslinking system of the present example is not dependent on temperature. The addition of the crosslinking system to the major phase was done in the manner presented in this example only to compare it directly to the composite prepared and set forth in Working Example 2.

This example demonstrates that a crosslinked conducting polymer composite with reduced conducting filler content can be generated using the percolation-within-percolation approach to establish a continuous conducting network and a means of crosslinking by moisture due to the presence of a hydrolyzable group grafted onto the backbone of the major phase material. This type of conducting polymer composite material is, heretofor, unknown in the art. Further this example demonstrates that, among other benefits, crosslinking, does not significantly affect the conductivity of the material.

WORKING EXAMPLE 2

A crosslinked conducting polymer composite having reduced conducting filler content was made according to the present invention using commercial grades of a random copolymer of EVA, HDPE, and furnace grade carbon black. The crosslinking means of the present example was accomplished by mixing an organic peroxide, 2,5-dimethyl-2,5-di-t-butylperoxy-hexyne-3, to the major phase material, EVA, and crosslinking at elevated temperatures to form a crosslinked conducting polymer composite. The characteristics of the materials used in this example are set forth in Table 3.

CB blend for 9 minutes. The mixer was then turned off and the binary composite (HDPE/CB blend) was removed from the mixer while still hot. After the binary composite cooled to room temperature, the binary composite was comminuted into pieces having approximately 0.75" maximum major axis, in order to ease the mixing of the ternary composite.

The mixing procedure for producing the ternary composite comprises measuring 100 grams of the EVA, 100 grams of the HDPE/CB blend, and 0.4 grams of 2,5-dimethyl, 2,5-di-t-butylperoxy-hexyne-3, preheating the mixer to 140° C., adding the EVA to the preheated rotating mixer, mixing the EVA for 30 seconds, adding the peroxide to the EVA in the mixer as the temperature of the EVA began to rise, preheating the HDPE/CB blend to approximately softening point in order to facilitate mixing, mixing the peroxide with the EVA for approximately 1.5 minutes, which allows the peroxide to be absorbed into the EVA, adding the preheated HDPE/CB blend to the EVA in the mixer once the temperature of the EVA reached 130° C., and mixing the HDPE/CB/EVA blend for an additional 5 minutes. The mixer was then shut down and the ternary composite was removed from the mixer while still hot. The ternary composite was cooled, then comminuted into approximately 0.75" pieces and molded into 0.075" thick plaques at 190° C. using between about 40 grams to about 50 grams of material for each plaque.

The plaques were then annealed by being heated to a temperature of about 150° C. for about 15 hours in a vacuum oven in order to induce phase separation of the minor phase (HDPE) and the major phase (EVA). In this example it is important to note that the binary composite formed, was conducting; however, the crosslinked ternary composite had a volume resistivity of approximately $10^{12}$ Ω·cm and was not conducting until the heating, annealing, process was complete. The Lupersol 130 peroxide has a half-life at 190° C. of about 1.5 minutes and will crosslink the EVA completely in about 4.5 to about 7.5 minutes at this temperature. Therefore, molding the composite plaques at this elevated temperature crosslinks the composite before the morphology

TABLE 3

| Constituent | Amount (w/w) | Tradename | Characteristics | Producer |
|---|---|---|---|---|
| EVA | 49.900 | Elvax 265 | 28 weight % VA content | Du Pont |
| HDPE | 43.907 | Petrothene LS6081-00 | density = 0.963 g/cm$^3$ | Millennium Chemical |
| carbon black | 5.993 | Vulcan XC72 | N$_2$ surface area = 254 m$^2$/g DBP oil absorption = 174 cm$^3$/100 g mean particle diameter = 300 Ångstroms | Cabot Corp. |
| Peroxide: 2,5-dimethyl-2,5-di-t-butylperoxy-hexyne-3 | 0.200 | Lupersol 130 | organic peroxide | Elf Atochem |

All composites were mixed in a Brabender Banbury mixer with a 300 cm$^3$ cavity using a 72 RPM (200 s$^{-1}$ shear rate). The mixing procedure for producing the binary conducting polymer composite, comprises preheating the mixer to 170° C.; measuring out 200 grams of HDPE and 27.3 grams of the carbon black; adding half of the HDPE to the preheated rotating mixer; adding the remaining half of the HDPE in two steps to the rotating mixer as the HDPE softened; mixing the HDPE in the mixer for 6 minutes; adding the carbon black to the mixing HDPE; and mixing the HDPE/ of the composite has a chance to coarsen. The post-crosslink heating allows the local level morphology of the composite to coarsen and increase the crystallinity of the minor phase, thus enhancing the conductivity of the composite. This was heretofore unknown in the art.

The samples of Working Example 2 were measured for tensile strength and maximum elongation, as well as for volume resistivity using the procedure as described in Working Example 1. Table 4 sets forth the physical and electrical properties of the crosslinked conducting ternary composite formed in this example of the present invention.

TABLE 4

| tensile strength[a,b] (psi) | maximum elongation[a,b] (%) | volume resistivity (Ω · cm) |
|---|---|---|
| >4314 | >575 | 6017.5 ± 679.5[c] |

[a]ASTM D 470 - ASTM D-412 Die C; draw rate was 2 in/min
[b]current testing apparatus was not capable of measuring actual material properties due to very high elongations
[c]68% confidence limits It should be noted in the present example that certain preparation steps, for example, comminuting the binary composite and preheating the binary composite prior to mixing with the EVA, were performed to facilitate the mixing process which in turn effects the time and speed for mixing. As such, these steps are not essential to formulate the conducting polymer composite of the present invention provided the constituents are mixed for a time and at a speed sufficient to ensure uniform distribution such that a continuous, conducting network is established.

This example demonstrates a crosslinked conducting polymer composite with reduced conductive filler material using a percolation-with-percolation approach and crosslinking by organic peroxide, which was heretofore unknown in the art. This example further demonstrates that the composite can be annealed and maintain sufficient conductivity.

WORKING EXAMPLE 3

A crosslinked conducting polymer composite having reduced conducting filler content was made according to the present invention using commercial grades of a random copolymer of EVA, HDPE, and furnace grade carbon black. The crosslinking means of the present example was accomplished by mixing 2,5-dimethyl-2,5-di-t-butylperoxy-hexyne-3, to the major phase material, EVA, and crosslinking the EVA at elevated temperatures to form a conducting polymer composite. The characteristics of the materials used in this example are set forth in Table 5.

TABLE 5

| Constituent | Amount (w/w) | Tradename | Characteristics | Producer |
|---|---|---|---|---|
| EVA | 39.936 | Elvax 265 | 28 weight % VA content | Du Pont |
| HDPE | 52.716 | Petrothene LS6081-00 | density = 0.963 g/cm$^3$ | Millennium Chemical |
| carbon black | 7.188 | Vulcan XC72 | N$_2$ surface area = 254 m$^2$/g DBP oil absorption = 174 cm$^3$/100 g mean particle diameter = 300 Ångstroms | Cabot Corp. |
| Peroxide: 2,5-dimethyl-2,5-di-t-butylperoxy-hexyne-3 | 0.160 | Lupersol 130 | organic peroxide | Elf Atochem |

The mixing procedure for producing the composite of the present example is identical to that of Example 2 heretofore described, except for differing weight percents of constituents as set forth in Table 5. However, in the present example, the composite was molded into plaques at 175° C. Because the molding of the plaques occurred at a lower temperature than in the previous example, complete crosslinking is accomplished in about 15 to 25 minutes, as the Lupersol 130 (2,5-dimethyl-2,5 di-t-butlyperoxy-hexyne-3) has a half-life of about 5 minutes at this temperature, allowing the morphology of the composite to coarsen simultaneously with the crosslinking.

The volume resistivity of the composite was measured using the procedure described in Working Example 1 and is set forth in Table 6.

TABLE 6

| sample | volume resistivity (Ω · cm) |
|---|---|
| composite after crosslinking | 1030 ± 107[a] |

[a]68% confidence limits

This example demonstrates that a crosslinked conducting polymer material with reduced filler conduct can be formulated through a percolation-with-percolation approach. Further, this example demonstrates that degradation of peroxide is an effective means for crosslinking and, in particular, will not result in significant effect on conductivity.

While various embodiments of the invention have been shown and described, it is to be understood that the above described embodiments are merely illustrative of the invention and other embodiments may be devised by those skilled in the art which will embody the principles of the. invention and fall within the spirit and scope thereof

What is claimed is:

1. A conducting polymer composite that is crosslinked, comprising:
    a minor phase material in the form of a semicrystalline polymer,
    a conducting filler material dispersed in said minor phase material in an amount which is at or just exceeds the percolation threshold and sufficient to generate a continuous conducting network in said minor phase material,
    a major phase material, said major phase material being a polymer which when mixed with said minor phase material will not engage in electrostatic interactions that promote miscibility, said major phase material having said minor phase material dispersed therein in an amount which is at or just exceeds the percolation threshold and sufficient to generate a continuous conducting network in said major phase material, forming a conducting polymer composite having co-continuous phases, and
    means for crosslinking said conducting polymer composite comprising irradiating said conducting polymer composite with radiation selected from the group of β and γ radiation for sufficient time to effect crosslinking of said conducting polymer composite.

2. A conducting polymer composite that is crosslinked, comprising:

a minor phase material in the form of a semicrystalline polymer, a conducting filler material dispersed in said minor phase material in an amount which is at or just exceeds the percolation threshold and sufficient to generate a continuous conducting network in said minor phase material, a major phase material, said major phase material being a polymer which when mixed with said minor phase material will not engage in electrostatic interactions that promote miscibility, said major phase material having said minor phase material dispersed therein in an amount which is at or just exceeds the percolation threshold and sufficient to generate a continuous conducting network in said major phase material, forming a conducting polymer composite having separate phases, and means for crosslinking said conducting polymer composite, comprising a hydrolyzable group and a catalyst, which when grafted onto said major phase material prior to said minor phase material being dispersed therein, and exposed to moisture effects crosslinking of said major phase such that said minor phase of said conducting polymer composite remains substantially uncrosslinked.

3. A conducting polymer composite that is crosslinked, comprising:

a minor phase material in the form of a semicrystalline polymer, a conducting filler material dispersed in said minor phase material in an amount which is at or just exceeds the percolation threshold and sufficient to generate a continuous conducting network in said minor phase material, a major phase material, said major phase material being a copolymer which includes a hydrolyzable group and a catalyst, which when mixed with said minor phase material will not engage in electrostatic interactions that promote miscibility, said major phase material having said minor phase material dispersed therein in an amount which is at or just exceeds the percolation threshold and sufficient to generate a continuous conducting network in said major phase material, forming a conducting polymer composite having separate phases, and chemically crosslinking the major phase of said conducting polymer composite such that the minor phase remains substantially uncrosslinked.

4. A conducting polymer composite that is crosslinked, comprising:

a minor phase material in the form of a semicrystalline polymer, a conducting filler material dispersed in said minor phase material in an amount which is at or just exceeds the percolation threshold and sufficient to generate a continuous conducting network in said minor phase material, a major phase material, said major phase material being a polymer which when mixed with said minor phase material will not engage in electrostatic interactions that promote miscibility, said major phase material having said minor phase material dispersed therein in an amount which is at or just exceeds the percolation threshold and sufficient to generate a continuous conducting network in said major phase material, forming a conducting polymer composite having separate phases, and crosslinking said conducting polymer composite by adding an organic peroxide to said major phase material prior to said minor phase material being dispersed therein, such that said major phase of said conductive polymer composite is crosslinked by free radicals upon the decomposition of said organic peroxide and said minor phase remains substantially uncrosslinked.

5. A method of producing a conducting polymer composite that is crosslinked which comprises:

mixing a minor phase semicrystalline polymer having a melting temperature at a temperature greater than or equal to said melting temperature of said semicrystalline polymer;

adding a conducting filler to said mixing semicrystalline polymer in an amount greater than or equal to the percolation threshold and sufficient to generate a continuous conducting network in said semicrystalline polymer;

mixing said conducting filler and said semicrystalline polymer to insure a uniform distribution of said conducting filler in said semicrystalline polymer, thereby forming a binary composite having a melting temperature;

mixing a major phase material having a melting temperature with said binary composite in a mixer preheated to at least said melting temperature of said major phase material and said melting temperature of said binary composite to insure a uniform distribution of said binary composite in said major phase material, such that a weight ratio of said binary composite to said major phase material is sufficient for said binary composite to be equal to or greater than the percolation threshold and sufficient to generate a continuous conducting network in said major phase material, said major phase material being selected from a group of polymers which when mixed with said binary composite will not engage in electrostatic interactions which promote miscibility, such that a conducting polymer composite having separate phases is formed; and crosslinking said conducting polymer composite by chemically crosslinking the major phase such that the minor phase remains substantially uncrosslinked.

6. The method of claim 1 further comprising the step of mixing a second major phase material having a melting temperature with said conducting polymer composite in a mixer preheated to above the melting temperature of said second major phase material, for a time and at a sufficient speed to insure a uniform distribution of said conducting polymer composite in said second major phase material, such that a weight ratio of said conducting polymer composite to said second major phase material is sufficient for said conducting polymer composite to be equal to or greater than the percolation threshold and sufficient to generate a continuous conducting network in said second major phase material, said second major phase material being selected from that group of polymers which when mixed with said conducting polymer composite will not engage in electrostatic interactions which promote miscibility with said binary composite or with said major phase material, such that a quaternary conducting polymer composite with co-continuous phases is formed.

7. The method of claim 6 further comprising the additional steps of mixing additional major phase materials with said quaternary conducting polymer composite in a mixer preheated to above the melting temperature of each additional major phase material, said additional major phase materials being polymers which when mixed with each other, said second major phase materials, said minor phase materials and said binary phase will not engage in electrostatic interactions the promote miscibility, such that a multi-phase immiscible conducting polymer composite material having distinct co-continuous phases is formed.

8. The method of claim 5 further comprising the step of annealing said conducting polymer composite.

9. The method of claim 5 further comprising the step of annealing said binary composite.

10. The method of claim 9, further comprising annealing said binary composite from below said binary composite's melting temperature prior to mixing said major phase material with said binary composite, said major phase material having a melting temperature less than said binary composite's melting temperature; and mixing said major phase material and said binary composite at a temperature below said melting temperature of said binary composite.

11. The method of claim 6 further comprising the step of annealing said quaternary conducting polymer composite.

12. The method of claim 7 further comprising the step of annealing said multi-phase immiscible conducting polymer composite.

13. A method of producing a conducting polymer composite that is crosslinked which comprises:

mixing a minor phase semicrystalline polymer having a melting temperature at a temperature greater than or equal to said melting temperature of said semicrystalline polymer;

adding a conducting filler to said mixing semicrystalline polymer in an amount greater than or equal to the percolation threshold and sufficient to generate a continuous conducting network in said semicrystalline polymer;

mixing said conducting filler and said semicrystalline polymer to insure a uniform distribution of said conducting filler in said semicrystalline polymer, thereby forming a binary composite having a melting temperature;

mixing a major phase material having a melting temperature with said binary composite in a mixer preheated to at least said melting temperature of said major phase material and said melting temperature of said binary composite to insure a uniform distribution of said binary composite in said major phase material, such that a weight ratio of said binary composite to said major phase material is sufficient for said binary composite to be equal to or greater than the percolation threshold and sufficient to generate a continuous conducting network in said major phase material, said major phase material being selected from a group of polymers which when mixed with said binary composite will not engage in electrostatic interactions which promote miscibility, such that a conducting polymer composite having co-continuous phases is formed; and crosslinking said conducting polymer composite by irradiating said conducting polymer composite with radiation selected from the group consisting of β and γ radiation for a sufficient time to effect crosslinking.

14. A method of producing a conducting polymer composite that is crosslinked which comprises:

mixing a minor phase semicrystalline polymer having a melting temperature at a temperature greater than or equal to said melting temperature of said semicrystalline polymer;

adding a conducting filler to said mixing semicrystalline polymer in an amount greater than or equal to the percolation threshold and sufficient to generate a continuous conducting network in said semicrystalline polymer;

mixing said conducting filler and said semicrystalline polymer to insure a uniform distribution of said conducting filler in said semicrystalline polymer, thereby forming a binary composite having a melting temperature;

mixing a major phase material having a melting temperature with said binary composite in a mixer preheated to at least said melting temperature of said major phase material and said melting temperature of said binary composite to insure a uniform distribution of said binary composite in said major phase material, such that a weight ratio of said binary composite to said major phase material is sufficient for said binary composite to be equal to or greater than the percolation threshold and sufficient to generate a continuous conducting network in said major phase material, said major phase material being selected from a group of polymers which when mixed with said binary composite will not engage in electrostatic interactions which promote miscibility, such that a conducting polymer composite having co-continuous phases is formed;

grafting a hydrolyzable group onto the major phase material not having a hydrolyzable group thereon by mixing a silane group, a catalyst, and an organic peroxide with said major phase material prior to mixing said major phase material and said binary composite, and exposing said conducting polymer composite to moisture to crosslink said conducting polymer composite.

15. A method of producing a conducting polymer composite that is crosslinked which comprises:

mixing a minor phase semicrystalline polymer having a melting temperature at a temperature greater than or equal to said melting temperature of said semicrystalline polymer;

adding a conducting filler to said mixing semicrystalline polymer in an amount greater than or equal to the percolation threshold and sufficient to generate a continuous conducting network in said semicrystalline polymer;

mixing said conducting filler and said semicrystalline polymer to insure a uniform distribution of said conducting filler in said semicrystalline polymer, thereby forming a binary composite having a melting temperature;

mixing a major phase material having a melting temperature with said binary composite in a mixer preheated to at least said melting temperature of said major phase material and said melting temperature of said binary composite to insure a uniform distribution of said binary composite in said major phase material, such that a weight ratio of said binary composite to said major phase material is sufficient for said binary composite to be equal to or greater than the percolation threshold and sufficient to generate a continuous conducting network in said major phase material, said major phase material being selected from a group of polymers which when mixed with said binary composite will not engage in electrostatic interactions which promote miscibility, such that a conducting polymer composite having co-continuous phases is formed;

mixing a second major phase material having a melting temperature with said conducting polymer composite in a mixer preheated to above the melting temperature of said second major phase material, for a time and at a sufficient speed to insure a uniform distribution of said conducting polymer composite in said second major phase material, such that a weight ratio of said conducting polymer composite to said second major phase material is sufficient for said conducting polymer composite to be equal to or greater than the percolation threshold and sufficient to generate a continuous conducting network in said second major phase material, said second major phase material being selected from a group of polymers which when mixed with said conducting polymer composite will not engage in electrostatic interactions which promote miscibility with said binary composite or with said major phase material, such that a quaternary conducting polymer composite with co-continuous phases is formed; and crosslinking said quaternary conducting polymer composite by means of grafting a hydrolyzable group onto the said second major phase by mixing a silane group, a catalyst and an organic peroxide with said second major phase prior to mixing said second major phase with other components.

16. A method of producing a conducting polymer composite that is crosslinked which comprises:

mixing a minor phase semicrystalline polymer having a melting temperature at a temperature greater than or equal to said melting temperature of said semicrystalline polymer;

adding a conducting filler to said mixing semicrystalline polymer in an amount greater than or equal to the percolation threshold and sufficient to generate a continuous conducting network in said semicrystalline polymer;

mixing said conducting filler and said semicrystalline polymer to insure a uniform distribution of said conducting filler in said semicrystalline polymer, thereby forming a binary composite having a melting temperature;

mixing a major phase material having a melting temperature with said binary composite in a mixer preheated to at least said melting temperature of said major phase material and said melting temperature of said binary composite to insure a uniform distribution of said binary composite in said major phase material, such that a weight ratio of said binary composite to said major phase material is sufficient for said binary composite to be equal to or greater than the percolation threshold and sufficient to generate a continuous conducting network in said major phase material, said major phase material being selected from a group of polymers which when mixed with said binary composite will not engage in electrostatic interactions which promote miscibility, such that a conducting polymer composite having co-continuous phases is formed;

mixing a second major phase material having a melting temperature with said conducting polymer composite in a mixer preheated to above the melting temperature of said second major phase material, for a time and at a sufficient speed to insure a uniform distribution of said conducting polymer composite in said second major phase material, such that a weight ratio of said conducting polymer composite to said second major phase material is sufficient for said conducting polymer composite to be equal to or greater than the percolation threshold and sufficient to generate a continuous conducting network in said second major phase material, said second major phase material being selected from a group of polymers which when mixed with said conducting polymer composite will not engage in electrostatic interactions which promote miscibility with said binary composite or with said major phase material, such that a quaternary conducting polymer composite with co-continuous phases is formed;

mixing additional major phase materials with said quaternary conducting polymer composite in a mixer preheated to above the melting temperature of each additional major phase material, said additional major phase materials being polymers which when mixed with each other, said second major phase materials, said minor phase materials and said binary phase will not engage in electrostatic interactions the promote miscibility, such that a multi-phase immiscible conducting polymer composite material having distinct co-continuous phases is formed; and grafting a hydrolyzable group onto the most major phase material not having a hydrolyzable group thereon by mixing a silane group, a catalyst and an organic peroxide with the most major phase material prior to mixing the most major phase material with other components.

17. The method of claim 5, wherein said major phase material comprises a copolymer, said copolymer includes a hydrolyzable group and a catalyst and said conducting polymer composite is crosslinked by exposing said conducting polymer composite to moisture.

18. The method of claim 6 wherein said second major phase material comprises a copolymer, said copolymer includes a hydrolyzable group and a catalyst and said quaternary conducting polymer composite is crosslinked by exposure to moisture.

19. The method of claim 7 wherein the most major phase material comprises a copolymer, said copolymer includes hydrolyzable group and a catalyst and said multi-phase immiscible conducting polymer composite is crosslinked by exposure to moisture.

20. The method of claim 5, wherein said conducting polymer composite is crosslinked by means of mixing an organic peroxide with said major phase material prior to mixing said major phase material with said binary composite, such that said conducting polymer composite crosslinks with decomposition of said organic peroxide.

21. The method of claim 6 wherein said quaternary conducting polymer composite is crosslinked by means of mixing an organic peroxide with said second major phase material prior to mixing said second major phase material with other components, such that said quaternary conducting polymer composite crosslinks with decomposition of said organic peroxide.

22. The method of claim 7 wherein said multi-phase immiscible conducting polymer composite is crosslinked by means of mixing an organic peroxide with the most major phase material prior to mixing the most major phase material and the composite material that is blended into the most major phase material such that crosslinking between the most major phase material and the composite material that is blended into the most major phase material occurs with decomposition of said organic peroxide.

23. The method of claim 5, further comprising the step of inducing phase separation between said semicrystalline polymer and said major phase material in said conducting polymer composite by heating said conducting polymer composite to a temperature above the melting temperature of both the major phase material and the semicrystalline polymer after the step of crosslinking.

24. A method of producing a conducting polymer composite that is crosslinked which comprises:
    mixing a minor phase semicrystalline polymer having a melting temperature at a temperature greater than or equal to said melting temperature of said semicrystalline polymer;
    adding a conducting filler to said mixing semicrystalline polymer in an amount greater than or equal to the percolation threshold and sufficient to generate a continuous conducting network in said semicrystalline polymer;
    mixing said conducting filler and said semicrystalline polymer to insure a uniform distribution of said conducting filler in said semicrystalline polymer, thereby forming a binary composite having a melting temperature;
    mixing a major phase material having a melting temperature with said binary composite in a mixer preheated to at least said melting temperature of said major phase material and said melting temperature of said binary composite to insure a uniform distribution of said binary composite in said major phase material, such that a weight ratio of said binary composite to said major phase material is sufficient for said binary composite to be equal to or greater than the percolation threshold and sufficient to generate a continuous conducting network in said major phase material, said major phase material being selected from a group of polymers which when mixed with said binary composite will not engage in electrostatic interactions which promote miscibility, such that a conducting polymer composite having co-continuous phases is formed;
    extruding said binary composite into threadlike structures about 2 millimeters long and about 0.25 millimeters in diameter prior to mixing said major phase material with said binary composite,
    mixing said major phase material and said extruded threadlike structures of binary composite at a temperature below said melting temperature of said binary composite; and
    crosslinking said conducting polymer composite.

25. The method of claim 5 further comprising comminuting said binary composite prior to mixing said major phase material with said binary composite and mixing said major phase material and said comminuted binary composite at a temperature below said melting temperature of said binary composite.

26. The method of claim 5, wherein said conducting filler is selected from the group of consisting of carbon black, graphite, metallic particles, carbon fibers, intrinsically conducting polymers, fullerenes, carbon nanotubes and mixtures thereof.

27. The method of claim 5, wherein said conducting filler comprises less than about 12% by weight of said conducting polymer composite.

28. The method of claim 5, wherein said conducting filler comprises less than about 6% by weight of said conducting polymer composite.

29. The method of claim 6 wherein said conducting filler comprises less that about 5% by weight of said quaternary conducting polymer composite.

30. The method of claim 5, further comprising mixing additives with said conducting polymer composite, in the amount of about 0.05% by weight to about 50% by weight of said conducting polymer composite.

31. The method of claim 30 wherein said additives are selected from the group consisting of antioxidants, nucleating agents, coupling agents, ultraviolet absorbers, ultraviolet stabilizers, pigments, dyes, reinforcing fillers, slip agents, plasticizers, processing aids, lubricants, viscosity control agents, tackifiers, anti-blocking agents, surfactants, extender oils, metal deactivators, voltage stabilizers, flame retardant fillers, boosters, catalysts, smoke suppressants, and mixtures thereof.

32. The method of claim 6, further comprising mixing additives with said quaternary conducting polymer composite, in the amount of about 0.05% by weight to about 50% by weight of said quaternary conducting polymer composite.

33. The method of claim 32 wherein said additives are selected from the group consisting of antioxidants, nucleating agents, coupling agents, ultraviolet absorbers, ultraviolet stabilizers, pigments, dyes, reinforcing fillers, slip agents, plasticizers, processing aids, lubricants, viscosity control agents, tackifiers, anti-blocking agents, surfactants, extenderoils, metal deactivators, voltage stabilizers, flame retardant fillers, boosters, catalysts, smoke suppressants, and mixtures thereof.

34. The method of claim 6, further comprising mixing additives with said multi-phase immiscible conducting polymer composite in the amount of about 0.05% by weight to about 50% by weight of said multi-phase immiscible conducting polymer composite.

35. The method of claim 24 wherein said additives are selected from the group consisting of antioxidants, nucleating agents, coupling agents, ultraviolet absorbers, ultraviolet stabilizers, pigments, dyes, reinforcing fillers, slip agents, plasticizers, processing aids, lubricants, viscosity control agents, tackifiers, anti-blocking agents, surfactants, extender oils, metal deactivators, voltage stabilizers, flame retardant fillers, boosters, catalysts, smoke suppressants, and mixtures thereof.

36. A crosslinked conducting polymer composite, comprising:
    a minor phase material in the form a semicrystalline polymer;
    a conducting filler material dispersed in said minor phase material in an amount which is at or just exceeds the percolation threshold and sufficient to generate a continuous conducting network in said minor phase material; and
    a major phase material, said major phase material being a semicrystalline polymer which when mixed with said minor phase material will not engage in electrostatic interactions that promote miscibility, said major phase material having said minor phase material dispersed therein in an amount which is at or just exceeds the percolation threshold and sufficient to generate a continuous conducting network in said major phase material, forming a conducting immiscible ternary composite having co-continuous phases which physically crosslinks, through crystalline regions.

37. A conducting polymer composite that is crosslinked, comprising:
    a minor phase material in the form of a semicrystalline polymer, a conducting filler material dispersed in said minor phase material in an amount which is at or just exceeds the percolation threshold and sufficient to generate a continuous conducting network in said minor phase material, a major phase material, said major phase material being a polymer which when mixed with said minor phase material will not engage in electrostatic interactions that promote miscibility, said major phase material having said minor phase material dispersed therein in an amount which is at or just exceeds the percolation threshold and sufficient to generate a continuous conducting network in said major phase material, forming a conducting polymer composite having separate phases, chemical means for crosslinking the major phase of said conducting polymer composite such that the minor phase remains substantially uncrosslinked, and additives in the amount of about 0.05% by weight to about 50% by weight of said crosslinked conducting polymer composite wherein said additives are selected from the group consisting of antioxidants, nucleating agents, coupling agents, ultraviolet absorbers, ultraviolet stabilizers, pigments, dyes, reinforcing fillers, slip agents, plasticizers, processing aids, lubricants, viscosity control agents, tackifiers, anti-blocking agents, surfactants, extender oils, metal deactivators, voltage stabilizers, flame retardant fillers, boosters, catalysts, smoke suppressants, and mixtures thereof.

* * * * *